May 9, 1950 E. S. HORRES 2,506,595
MOVING PICTURE PROJECTOR ATTACHMENT
Filed Feb. 12, 1945 2 Sheets-Sheet 1
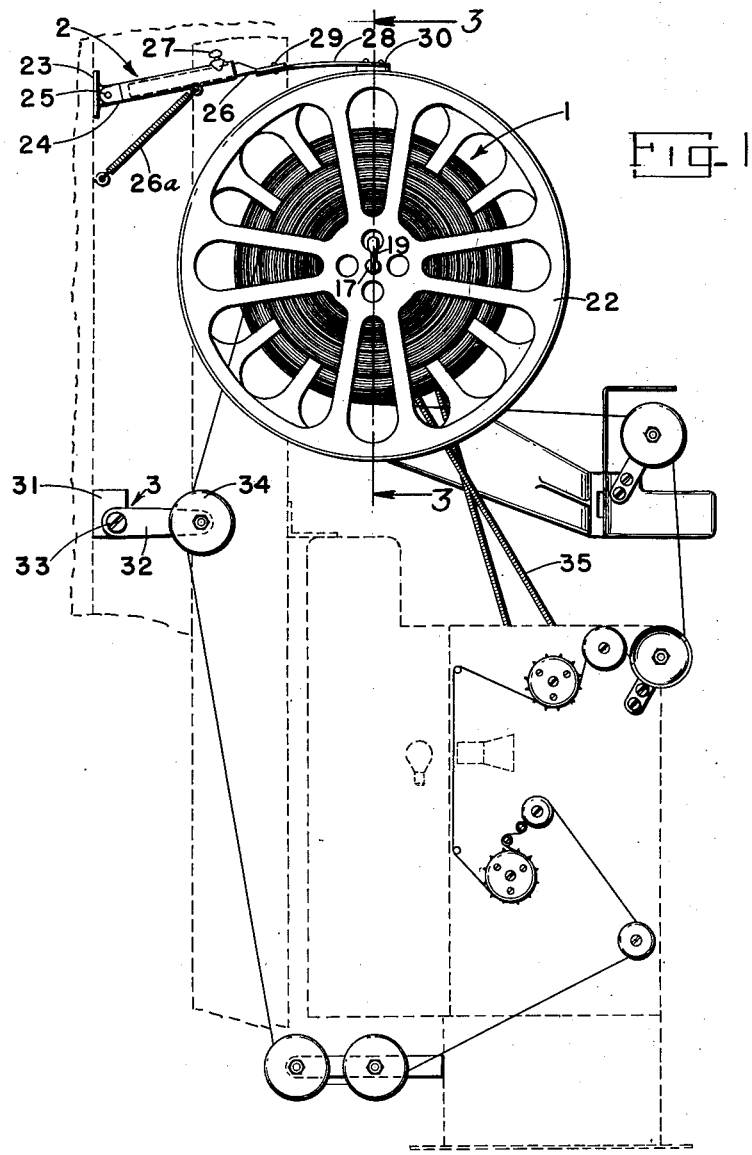
INVENTOR
EUGENE S. HORRES May 9, 1950 E. S. HORRES 2,506,595
MOVING PICTURE PROJECTOR ATTACHMENT
Filed Feb. 12, 1945 2 Sheets-Sheet 2
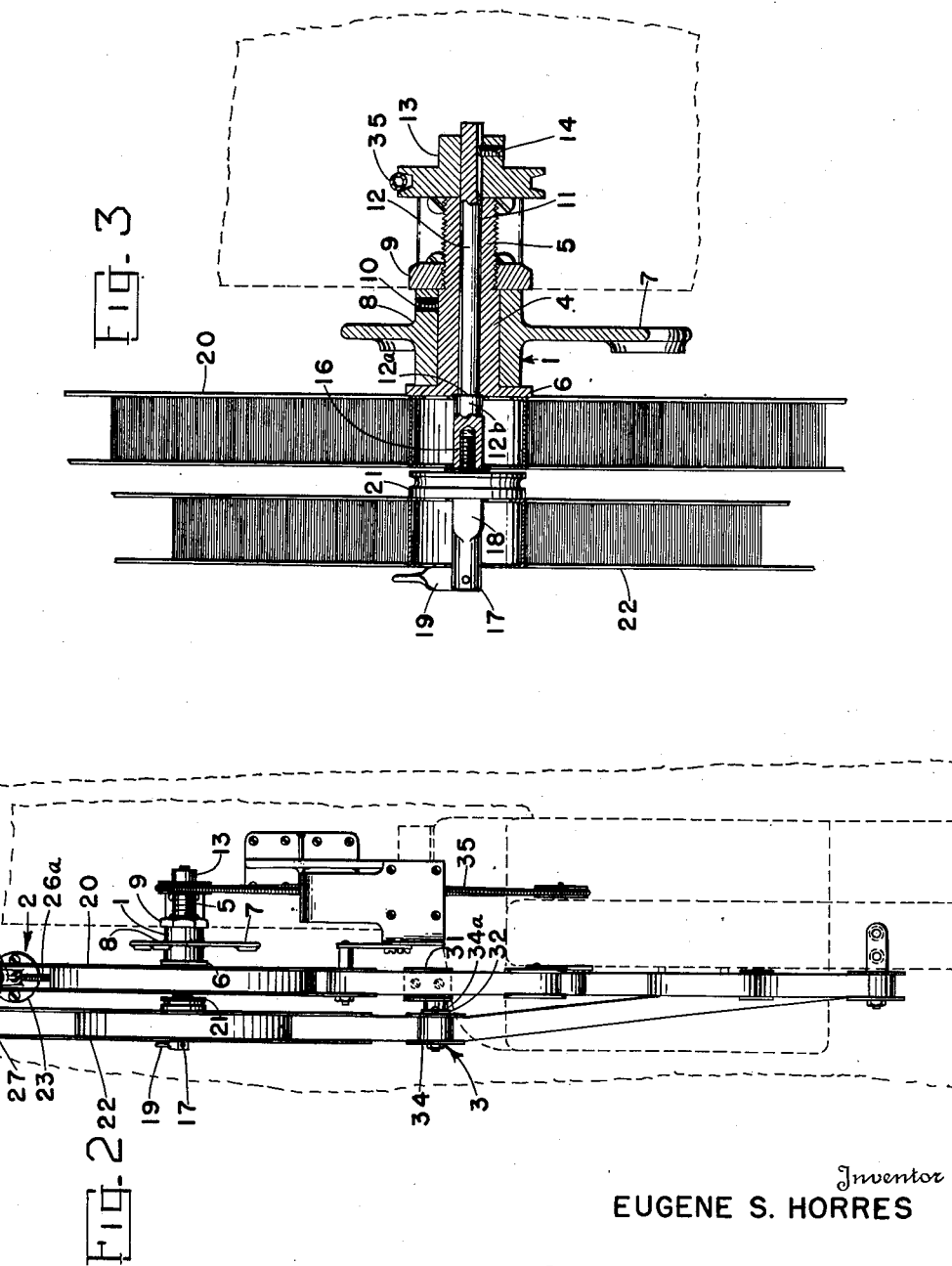
Inventor
EUGENE S. HORRES
By Ralph L. Chappell
Attorney Patented May 9, 1950

2,506,595

UNITED STATES PATENT OFFICE 2,506,595

MOVING PICTURE PROJECTOR ATTACHMENT

Eugene S. Horres, United States Navy

Application February 12, 1945, Serial No. 577,397

2 Claims. (Cl. 242—55)

(Granted under the act of March 3, 1883, as amended April 30, 1928; 370 O. G. 757)

This invention relates to moving picture projectors and, more particularly, to a device for converting a panoramic projector of the continuous type to a projector of the non-continuous type.

In a well-known type of panoramic cabinet projector, provision is made for the use of a continuous rewind for the film so that the same film will be projected repeatedly on the screen. Such an arrangement is very desirable for some purposes, but in many instances it is desirable to have an arrangement so that the machine can be converted to show any of the standard non-continuous films.

One of the objects of this invention is to provide a reel assembly for converting a continuous type projector to a non-continuous type, such assembly being extremely simple and being of such a nature that it may be quickly and easily mounted on or removed from the projector.

Another object of this invention is to provide a reel assembly of the type indicated which is of such a nature that conversion of the continuous projector into one of a non-continuous type is accomplished in such a manner that reconversion can be accomplished readily.

The preferred embodiment of this invention is illustrated in the accompanying drawings wherein similar characters of reference designate corresponding parts and wherein:

Fig. 1 is a side elevation of the film reel mechanism of a projector embodying the invention.

Fig. 2 is a front elevation of the structure shown in Fig. 1, the view being from the right thereof, and Fig. 3 is a detailed cross-sectional elevation, taken on line 3—3 of Fig. 1.

The present invention provides means to accomplish the conversion of a continuous type projector into a projector adapted to use any standard non-continuous film by the use of an extremely simple mechanism including a reel mount unit 1, a friction brake unit 2, and a rider or idling pulley unit 3, illustrated in the drawings. These units are adapted to be mounted on a continuous type projector which is illustrated diagrammatically in the drawings.

The reel mount unit 1, as illustrated in Fig. 3, comprises a body member 4 in the form of a sleeve, the diameter of which is reduced at one end and threaded at 5, and which embodies a flange 6 at its opposite end. When installed on the continuous type projector, the sleeve 4 is rigidly mounted on a bracket 7 carried by the projector at the forward and upper portion thereof. The bracket 7 normally carries the continuous film magazine of the projector. It is provided with a sleeve-like housing 8. The sleeve 4 fits in the bore of the housing 8, and is prevented from rotating therein by the set screw 10. A nut 9 is threaded on the extension 5 and is adapted to be tightened up against the housing 8, so that the housing will be gripped between the nut and the flange 6. This gripping action can be made effective in spite of variations in the length of the housing 8.

The sleeve 4 is provided with a bore 11 extending therethrough, in which the shaft 12 rotatably mounted. Shaft 12 has a shoulder 12a formed thereon, against which the shoulder 6 of sleeve 4 abuts, and which limits movement of the shaft 12 in bore 11 of sleeve 4. At its end at the right in Fig. 3, the shaft 12 has a pulley 13 keyed thereto by means of a set screw 14. The pulley 13 lies closely adjacent the end of the sleeve 4 that is threaded at 5. At its other end the shaft 12 is drilled and tapped at 16 to receive the screw threaded end of a reel-supporting stub shaft 18 which is squared as shown to fit the internal square opening in the hub of a standard reel 22. The reel 22 is thereby keyed to the stub-shaft 18 which rotates with the shaft 12. A pivoted latch 19 is carried on the extreme end 17 of shaft 18. When the device of the present invention is in use, the film-carrying feed or let-off reel 20 is mounted to rotate on the bearing portion 12b of shaft 12, reel 20 being in thrust-bearing contact with flange 6. The reel 22 is positioned on the stub-shaft 18, a spacer member or collar 21 first being mounted on the shaft 18 to space let-off reel 20 from take-up reel 22.

The friction brake assembly 2 is illustrated in Figs. 1 and 2. It includes a fitting or bracket 23 which may be secured to the inside of the cabinet of the projector at a point above and closely adjacent the unit 1. The arm 24 is mounted to pivot at 25 on the bracket 23 for vertical swinging movement. The arm 24 is tubular and the cylindrical rod 26 is mounted slidable in the tube of rod 24 to adjust its length, the set screw 27 being operable to hold the arm 24 to its desired length of adjustment. At its end of rod 26 is flattened and the end of a leaf spring 28 is riveted or otherwise secured thereto, as at 29. The outer end of spring 28 carries a friction shoe 30 which engages the periphery of the let-off reel 20. A tension spring 26a is provided for pulling the member 24 downwardly and maintaining shoe 30 in frictional contact with the reel 20.

The rider or idling pulley unit 3 is illustrated in Figs. 1 and 2. It is disposed below and in substantially the same vertical plane as the take-up reel 22. It comprises a fitting or bracket 31 secured to the cabinet of the projector. An arm 32 has its inner end pivoted thereto, as at 33, for vertical swinging movement. The outer end of this arm 32 carries a rotatable idler wheel 34. A spacer 34a, Fig. 2, spaces the wheel from the arm 32. The wheel 34 operates to guide the film in its passage in the vertical plane of the let-off reel 20 to the vertical plane of the take-up reel 22, the idler wheel 34 accordingly being in the plane of the take-up reel 22 as illustrated in Fig. 2 adapted to receive the film and guide it into take-up.

To convert the continuous projector, so that it is adaptable for use with any standard film, the continuous film magazine is removed from the projector. This magazine is ordinarily carried by the bracket 7. The film is removed also from all of the guide wheels illustrated in Fig. 1. These various guide wheels, with the exception of wheel 34 are the usual ones and are not part of this invention.

The sleeve 4 is positioned in the bore of the bracket 7, with the shoulder 6 in abutting engagement therewith. The nut 9 is then applied to the threaded portion 5 of the sleeve 4 and tightened, the set screw 10 being also tightened. The shaft 12 is then projected through the bore 11 of sleeve 4 with the shoulder 12a in engagement with the shoulder 6, and the pulley 13 is keyed to the shaft 12, by means of the set screw 14. The let-off reel 20 is then positioned on bearing portion 12b of the shaft 12 and the stub-shaft 18 is threaded into the opening 16, the spacer member 21 having first been applied thereto. An empty take-up reel 22 is then mounted on the stub-shaft 18, and is locked thereto by means of the pivoted latch 19. Since the take-up reel 22 is keyed to the stub-shaft 18 that is squared, it may be operated as a wrench to tighten the shaft 18 into the threaded opening 16 of shaft 12.

The units 2 and 3 are then secured in position by attaching them to the cabinet of the projector in the positions indicated in Figs. 1 and 2.

The film from the feed reel 20 is then threaded through the projector and to the take-up reel 22 in the usual manner except that it also passes into association with wheel 34. The take-up reel 22 is positively driven by means of the shaft 12 which is driven by pulley 13. Pulley 13 may be driven by means of a coil spring type belt 35 which is driven by the usual driving mechanism of the projector. The feed reel 20 is freely rotatable on the shaft 12 but is prevented from feeding too fast by friction exerted in its periphery by drag-brake shoe 30. The wheel 34 will guide the film to take-up reel 22. It will be apparent that a certain amount of frictional contact is also exerted by the spacer 21 the amount depending upon the degree of its compression.

The present invention provides a simple assembly for easily converting a continuous-film projector to one which can show standard films. This conversion is made in such a manner that reconversion to the continuous type may be accomplished with ease.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

Having thus described my invention, what I claim and desire to secure by Letters Patent is:

1. In apparatus of the type described, a sleeve, a shaft mounted to rotate in the sleeve and extending beyond the opposite ends thereof, a let-off reel mounted at one end of the sleeve to rotate on the shaft, a drive pulley attached to the shaft at the other end of the sleeve, a stub shaft attached to rotate with the shaft of the let-off reel and extending from the end thereof adjacent to the let-off reel, a take-up reel mounted on the stub shaft and keyed thereto to rotate therewith, a spacer collar between the let-off and take-up reels.

2. In apparatus as defined in claim 1, the sleeve comprising a flange at one end thereof and exterior screw-threading at the other, a bracket mounted on the sleeve exterior thereof and disposed in abutting engagement with the flange, a nut threaded to the sleeve and positioned to hold the bracket against the flange.

EUGENE S. HORRES.

REFERENCES CITED

The following references are of record in the file of this patent:

UNITED STATES PATENTS

| Number | Name | Date |
|---|---|---|
| 681,932 | Skirrow | Sept. 3, 1901 |
| 1,303,542 | De Vry | May 13, 1919 |
| 1,340,710 | Graham | May 18, 1920 |
| 1,525,990 | Howell | Feb. 10, 1925 |
| 1,548,960 | Stuber et al. | Aug. 11, 1925 |
| 1,713,277 | Goldberg et al. | May 14, 1929 |
| 2,153,666 | Hill et al. | Apr. 11, 1939 |
| 2,194,879 | Von Mihaly et al. | Mar. 26, 1940 |
| 2,241,232 | Wittel | May 6, 1941 |
| 2,256,899 | Greenwood | Sept. 23, 1941 |